United States Patent
Madrid

[19]

[11] Patent Number: 5,937,792
[45] Date of Patent: Aug. 17, 1999

[54] PET SHELTER CONSTRUCTION

[76] Inventor: Lee D. Madrid, 4207 11th St., NW., Albuquerque, N.Mex. 87107

[21] Appl. No.: 09/065,301

[22] Filed: Apr. 23, 1998

[51] Int. Cl.⁶ .................................................. A01K 1/02
[52] U.S. Cl. .......................... 119/482; 119/485; 119/500
[58] Field of Search .................................. 119/482, 483, 119/485, 487, 500, 501, 436, 444, 452, 480; 52/302.1

[56] References Cited

U.S. PATENT DOCUMENTS

| | | | |
|---|---|---|---|
| 349,480 | 9/1886 | Chenoweth | 119/444 |
| 1,367,416 | 2/1921 | Meszaros | 119/487 |
| 1,473,019 | 11/1923 | Dawley | 119/487 |
| 2,712,677 | 7/1955 | Hyde | 52/66 |
| 2,732,826 | 1/1956 | Dawson | 119/482 |
| 2,787,028 | 4/1957 | Webb | 52/198 |
| 3,865,425 | 2/1975 | French | 296/24.2 |
| 3,951,106 | 4/1976 | Wright | 119/482 |
| 4,224,899 | 9/1980 | Cruchelow et al. | 119/501 |
| 4,696,260 | 9/1987 | Panessidi . | |
| 4,844,016 | 7/1989 | Filosa | 119/481 |
| 5,003,923 | 4/1991 | Morgan . | |
| 5,099,794 | 3/1992 | Pearce, Jr. . | |
| 5,220,883 | 6/1993 | Long . | |
| 5,727,501 | 3/1998 | York | 119/482 |

OTHER PUBLICATIONS

"Popular Mechanics", Aug. 1943, p. 97.

*Primary Examiner*—Michael J. Carone
*Assistant Examiner*—James S. Bergin
*Attorney, Agent, or Firm*—Henderson & Sturm

[57] ABSTRACT

A pet shelter construction 10 including a floor unit 11 having a solar heat reservoir 22 raised above the ground by runner elements 24 and supporting a concrete floor pad 20 which in turn supports an enclosure unit 12 having an enlarged window 38 formed in the southern wall panel 30 of the enclosure unit 12 for receiving solar energy and a moveable roof unit 13 dimensioned to selectively overlie the southern 30 and northern 31 wall panels of the enclosure unit 12 to vary the amount of solar energy transmitted through the enlarged window 38.

6 Claims, 1 Drawing Sheet

PET SHELTER CONSTRUCTION

FIELD OF THE INVENTION

The present invention relates to the field of animal shelters in general, and in particular to a pet shelter construction having means for controlling the amount of solar energy delivered to and retained within the interior of the pet shelter.

DESCRIPTION OF RELATED ART

As can be seen by reference to the following U.S. Pat. Nos. 4,696,260; 5,003,923; 5,099,794; and 5,220,883, the prior art is replete with myriad and diverse animal shelter constructions.

While all of the aforementioned prior art constructions are more than adequate for the basic purpose and function for which they have been specifically designed, they are uniformly deficient with respect to their failure to provide a simple, efficient, and practical all season animal shelter construction which has a moveable roof unit to vary the amount of solar energy that is transmitted to the interior of the shelter construction in response to seasonal demands.

As any pet owner is all too well aware, it is imperative to provide outdoor pets such as dogs, with a cool shelter during the warm summer days, and a warm shelter during the cold winter days and even colder winter nights.

As a consequence of the foregoing situation, there has existed a longstanding need for a new and improved pet shelter construction having a practical means of controlling the solar energy delivered to and retained in the interior of the pet shelter, and the provision of such a construction is a stated objective of the present invention.

BRIEF SUMMARY OF THE INVENTION

Briefly stated, the pet shelter construction that forms the basis of the present invention comprises in general, a raised floor unit, an enclosure unit resting on the raised floor unit, and a roof unit which is supported by and moveable with respect to the enclosure unit.

As will be explained in greater detail further on in the specification, the raised floor unit has a sand based solar heat reservoir which supports a carpet covered concrete floor pad which is exposed to the solar rays through an enlarged hinged window formed in the front wall panel of the enclosure unit. The sand based solar heat reservoir is contained within a floor bed pan which is raised off the ground by a plurality of runner elements.

In addition, the enclosure unit further includes an air vent disposed in one of the four wall panels and a pet door providing access into the interior of the enclosure unit through another wall panel. The hinged window also provides access for the pet owner into the interior of the enclosure unit.

Furthermore, the roof unit is moveably associated with respect to the enclosure unit to vary the solar energy that is transmitted through the enlarged window in accordance with seasonal demands.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
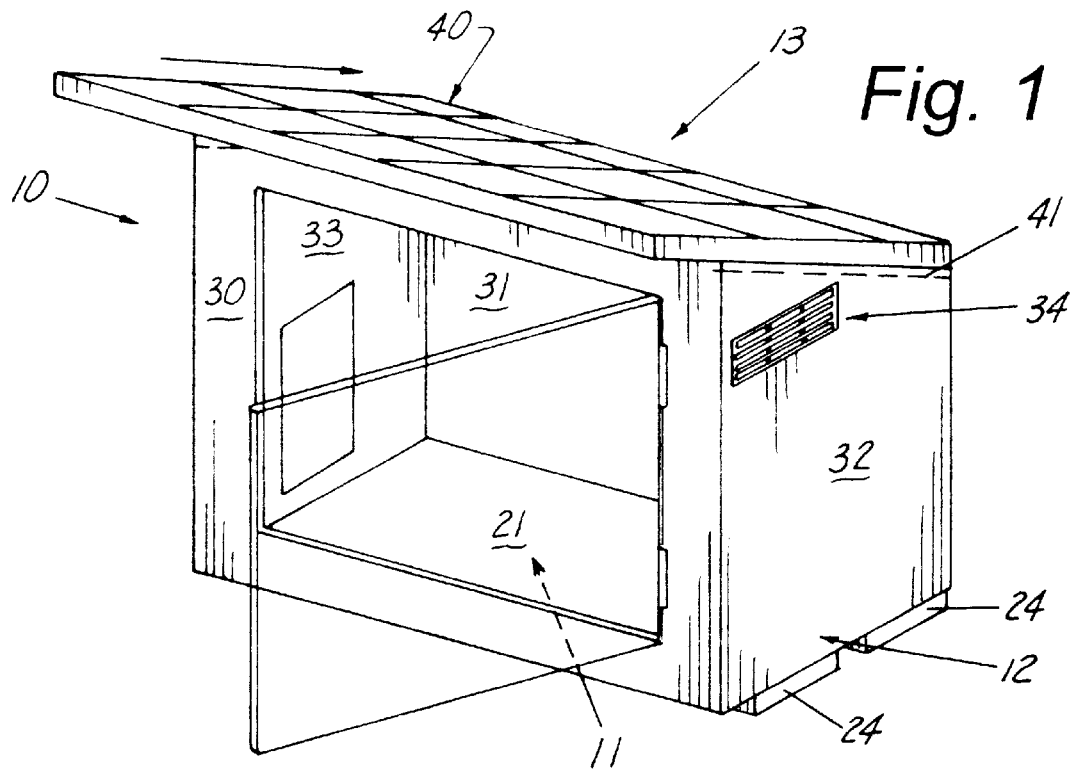
FIG. 1 is a perspective view of the all season pet shelter construction with the roof in the extended summer mode.

As can be seen by reference to the drawings, and in particularly to FIG. 1, the pet shelter construction that forms the basis of the present invention is designated generally by the reference number 10. The shelter construction 10 comprises in general a raised floor unit 11, an enclosure unit 12, and a moveable roof unit 13. These units will now be described in seriatim fashion.

Figure 2:
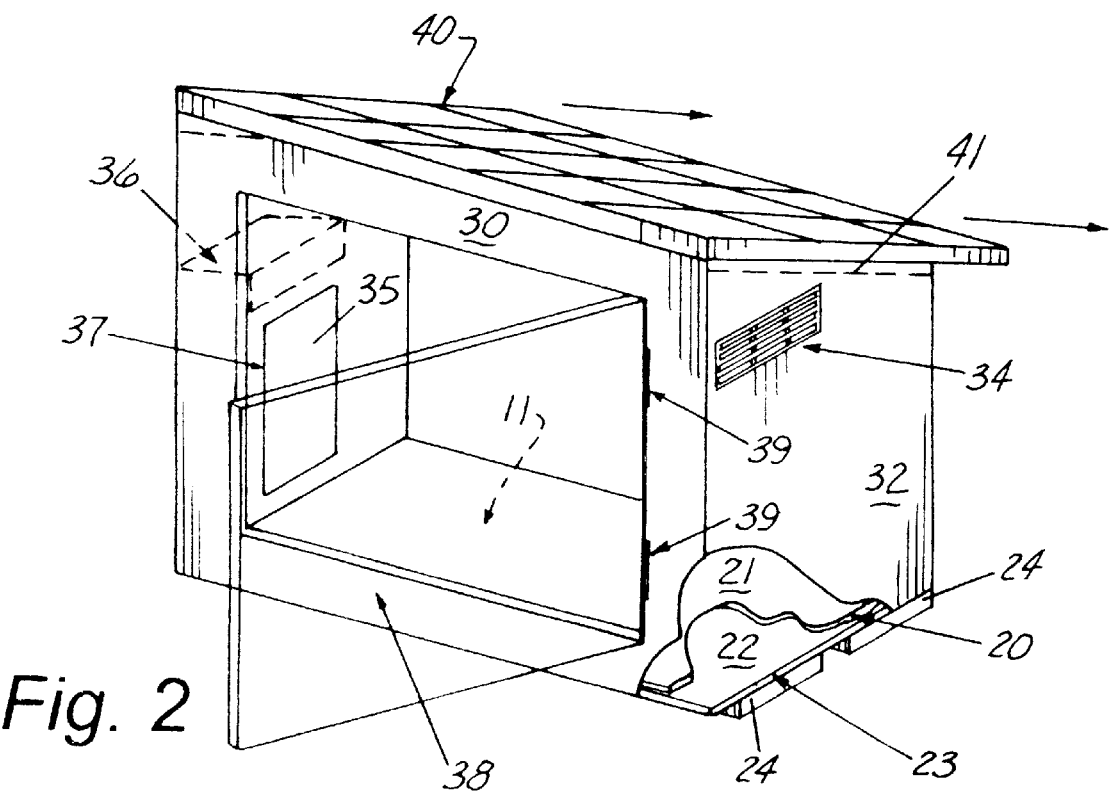
FIG. 2 is a partial cut away view of the pet shelter construction with the roof in the retracted winter mode.

As shown in FIGS. 1 and 2, the raised floor unit 11 comprises a concrete floor pad 20 covered with carpet 21 which rests on top of a layer of sand 22 contained within a floor bed pan 23 which is supported on a plurality of runner elements 24 that raises the floor unit 11 off of the ground.

In addition, the enclosure unit 12 comprises four wall panels which include an enlarged elongated rectangular front wall panel 30, a reduced height elongated rectangular rear wall panel 31, and a pair of mirror image angled top side wall panels 32 and 33.

Furthermore, one side wall panel 32 is provided with an air vent 34, the other side wall panel 33 with a pet door 35 having an overhang 36 and the enlarged front wall panel 30 is provided with an enlarged rectangular opening 37 which is dimensioned to receive a twin wall glazed polycarbonite window 38 which is hingedly connected as at 39 to serve as an access door into the interior of the enclosure unit 12.

As can also be seen by reference to FIGS. 1 and 2, the roof unit 13 comprises an elongated rectangular slanted roof member 40 which is wider than the enclosure unit 12 and retractably mounted on the top of the enclosure unit 12 whereby the roof member 40 may be extended into an overhanging relationship with respect to the front wall panel 30 as shown in FIG. 1 to provide shade during the summer months to minimize solar heating of the interior of the enclosure unit 12 during warm weather. The roof member 40 may be retracted into a generally flush relationship with respect to the front wall panel 30 as shown in FIG. 2 to maximize the solar energy that passes through the window 38 and into the concrete floor pad and the sand 22 which forms a solar heat reservoir.

In the preferred embodiment of the invention depicted in the drawings, the roof member 40 may be mounted on tracks 41 depicted in phantom which are disposed on the interior of the side wall panels 32 and 33; however, it should also be noted that the roof member 40 could be dimensioned such that the interior of the roof member 40 is dimensioned to simply rest upon the wall panels 30, 31, 32, 33 of the enclosure unit 12 in a well recognized manner, such that the roof member 40 can be lifted up from the enclosure unit 12 and repositioned with respect thereto to vary the disposition of the roof unit 13 relative to the enclosure unit 12 according to seasonal requirements.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

I claim:

1. A pet shelter comprising:

a raised floor unit including a concrete pad operatively associated with a plurality of runner elements for raising the concrete floor pad above the level of the ground;

an enclosure unit resting on the floor unit and including an enlarged rectangular front wall panel, a smaller rectangular rear wall panel, and a pair of opposed side wall panels having rearwardly angled tops wherein the upper portion of the side wall panels are provided with tracks and wherein one of the side wall panels is provided with a pet access door;

a moveable roof unit including an elongated roof member which is dimensioned to overlie all of said wall panels and selectively extend substantially beyond the front and rear wall panels respectively, wherein said roof member is slidably disposed on said tracks for moving the roof member from a substantially overhanging relationship relative to the front wall panel and to the rear wall panel.

2. The construction as in claim 1 wherein the front wall panel is provided with an enlarged opening equipped with an enlarged window.

3. The construction as in claim 2 wherein said enlarged window is hingedly associated with said enlarged opening.

4. The construction as in claim 3 wherein one of said side wall panels is provided with an air vent.

5. The construction as in claim 4 wherein said floor unit is further provided with a floor bed pan which rests on said runner elements and contains a layer of sand which supports said concrete floor pad.

6. The construction as in claim 5; wherein said pet access door is provided with an overhang.

* * * * *